United States Patent
Hu et al.

(10) Patent No.: US 12,356,510 B2
(45) Date of Patent: Jul. 8, 2025

(54) METALLIZED CARBON NANOTUBE ELEMENTS FOR ELECTROTHERMAL ICE PROTECTION

(71) Applicant: GOODRICH CORPORATION, Charlotte, NC (US)

(72) Inventors: Jin Hu, Hudson, OH (US); Casey Slane, Tallmadge, OH (US); Daniel Waina, Uniontown, OH (US); Nathaniel Ching, Hartville, OH (US); Brandon Hein, Stow, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1019 days.

(21) Appl. No.: 16/933,833

(22) Filed: Jul. 20, 2020

(65) Prior Publication Data

US 2022/0022286 A1   Jan. 20, 2022

(51) Int. Cl.
*H05B 3/34* (2006.01)
*B64C 27/46* (2006.01)
*B64D 15/12* (2006.01)
*H05B 3/14* (2006.01)

(52) U.S. Cl.
CPC ............ *H05B 3/145* (2013.01); *B64C 27/46* (2013.01); *B64D 15/12* (2013.01); *H05B 3/347* (2013.01); *H05B 2214/02* (2013.01); *H05B 2214/04* (2013.01)

(58) Field of Classification Search
CPC .... H05B 3/145; H05B 3/347; H05B 2214/02; H05B 2214/04; H05B 3/34; B64C 27/46; B64D 15/12; Y02E 10/72; F03D 80/40
See application file for complete search history.

(56) References Cited

U.S. PATENT DOCUMENTS

| | | | |
|---|---|---|---|
| 8,752,279 B2 | 6/2014 | Brittingham et al. | |
| 9,198,232 B2 | 11/2015 | Lashmore et al. | |
| 10,115,492 B2 | 10/2018 | Richmond et al. | |
| 10,425,993 B2 | 9/2019 | Slane et al. | |
| 10,464,680 B2 | 11/2019 | Kinlen et al. | |
| 10,854,351 B1* | 12/2020 | Ganguli | B22F 1/18 |
| 2006/0062944 A1* | 3/2006 | Gardner | F41H 5/0485 |
| | | | 428/34.1 |
| 2013/0028744 A1* | 1/2013 | Nordin | F15D 1/12 |
| | | | 428/113 |
| 2013/0043342 A1 | 2/2013 | Nordin et al. | |

(Continued)

FOREIGN PATENT DOCUMENTS

| | | |
|---|---|---|
| EP | 3342702 | 7/2018 |
| WO | 2012118434 | 9/2012 |

OTHER PUBLICATIONS

European Patent Office, European Search Report dated Dec. 3, 2021 in Application No. 21186458.2.

*Primary Examiner* — Tiffany T Tran
(74) *Attorney, Agent, or Firm* — SNELL & WILMER L.L.P.

(57) ABSTRACT

An ice protection system may include a blade and an electrothermal heater including a carbon nanotube (CNT) element and a metal element. The CNT element may be a CNT fabric or a CNT yarn. The metal element may be coupled to the CNT element via a metallization process, or the like. The electrothermal heater element may include an electric sheet resistivity between 0.01 and 0.5 ohms/square.

8 Claims, 10 Drawing Sheets

(56) References Cited

U.S. PATENT DOCUMENTS

| | | |
|---|---|---|
| 2015/0083863 A1 | 3/2015 | Karthauser et al. |
| 2016/0221680 A1 | 8/2016 | Burton et al. |
| 2016/0366724 A1 | 12/2016 | Kessler et al. |
| 2018/0168002 A1* | 6/2018 | Slane ................. H05B 3/34 |
| 2018/0168003 A1* | 6/2018 | Mullen ............... B64D 15/12 |
| 2018/0339473 A1 | 11/2018 | Zhao et al. |
| 2019/0185632 A1* | 6/2019 | Christy ............ C08G 16/0231 |
| 2019/0341170 A1 | 11/2019 | Wagner et al. |
| 2019/0357312 A1 | 11/2019 | Linde et al. |
| 2020/0020462 A1* | 1/2020 | Garrett .............. H01B 11/1869 |
| 2022/0034602 A1* | 2/2022 | Koehne ................ F28F 3/022 |

* cited by examiner

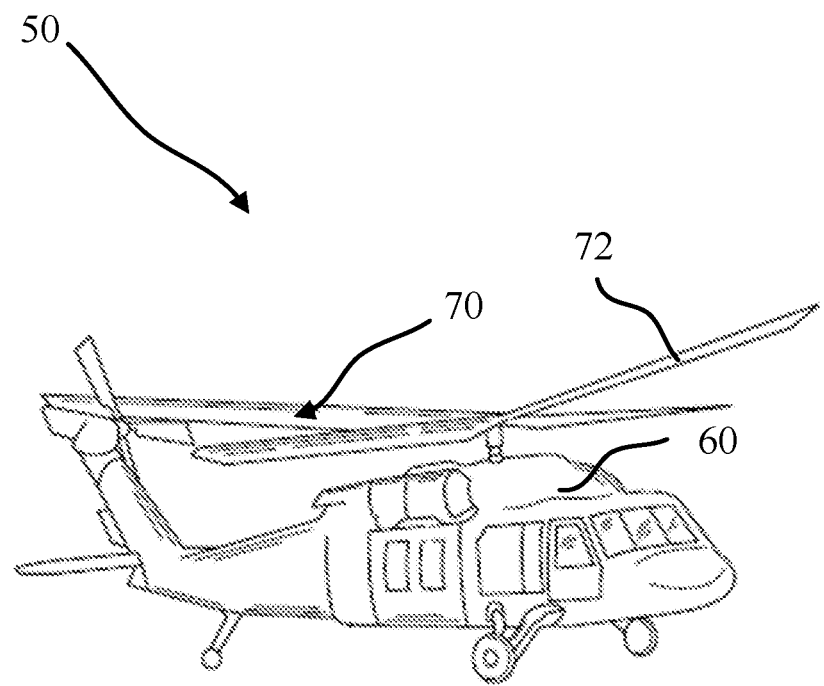
FIG. 1B

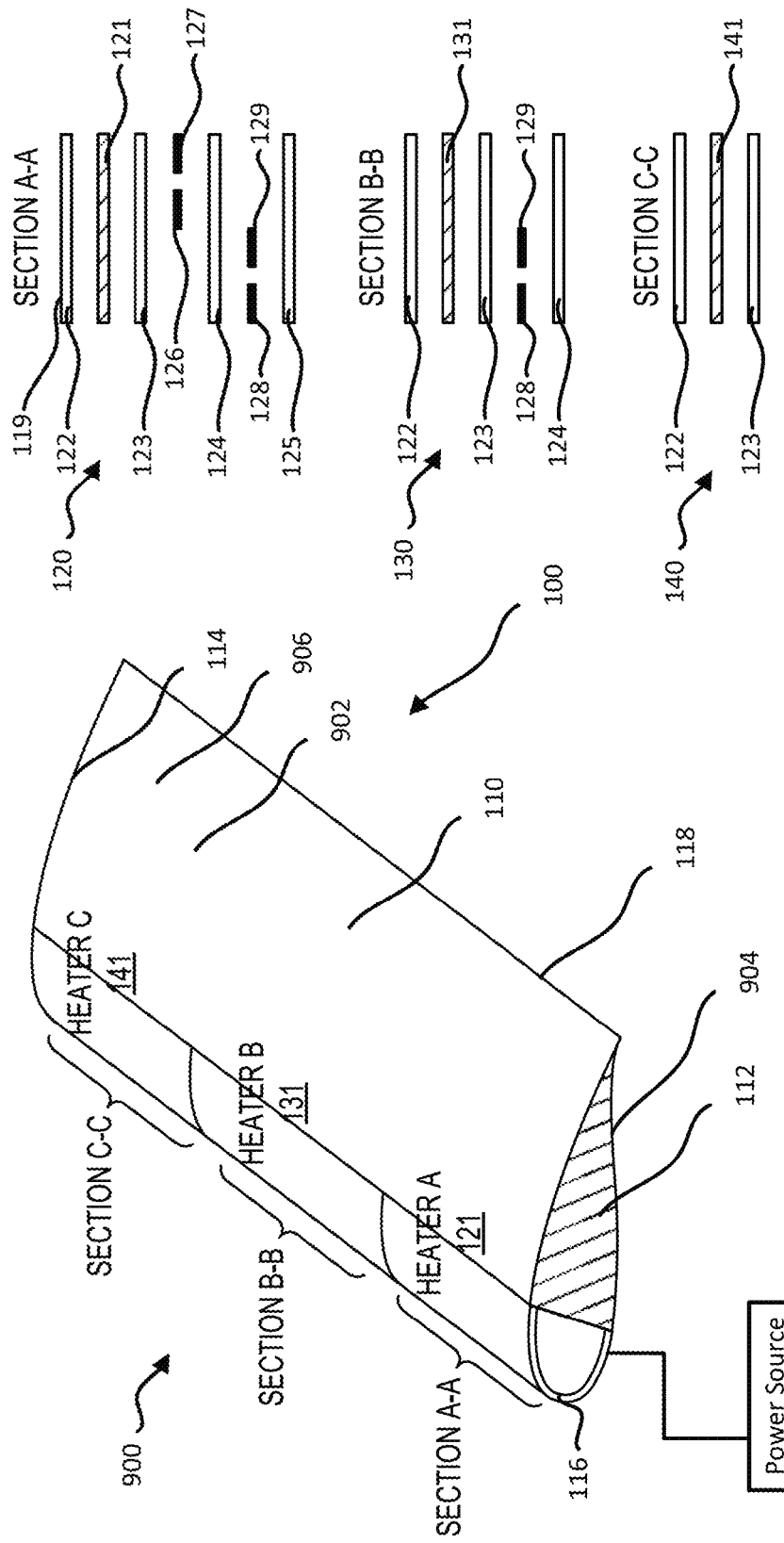

METALLIZED CARBON NANOTUBE ELEMENTS FOR ELECTROTHERMAL ICE PROTECTION

FIELD

The present disclosure relates to ice protection systems for various airfoils, and more particularly, to metallized carbon nanotube (CNT) elements for use in electrothermal ice protection systems.

BACKGROUND

Ice accretion may occur on various airfoils, such as wings, propellers, proprotors, helicopter rotors, wind turbine, or the like, due to cold temperatures at high altitudes. Traditional electrothermal heaters may consume large power and/or energy and have higher weight resulting in greater cost of an ice protection system.

SUMMARY

An ice protection system is disclosed herein. The ice protection system may comprise an electrothermal heater configured to receive a current from a power source, the electrothermal heater comprising a first plurality of metallized carbon nanotube (CNT) elements in disposed in a first direction and a second plurality of metallized carbon nanotube (CNT) elements in a second direction.

In various embodiments, the ice protection system may further comprise a blade, wherein the blade is a rotary blade for an aircraft, and wherein the electrothermal heater comprises an electric sheet resistivity between 0.01 and 0.5 ohms/square. The metallized CNT element may comprise a metallized CNT fabric. The metallized CNT element may comprise a plurality of metallized CNT yarn. The plurality of metallized CNT yarn may form a woven pattern. The metallized CNT element may comprise a metallic mesh and a CNT yarn. The CNT yarn may be woven through the metallic mesh.

A blade assembly is disclosed herein. The blade assembly may comprise: an airfoil including a leading edge, a trailing edge, a pressure side and a suction side, the pressure side extending from the leading edge to the trailing edge, the suction side extending from the leading edge to the trailing edge; and an ice protection system disposed on at least one of the leading edge, the pressure side, and the suction side, the ice protection system comprising an electrothermal heater coupled to the airfoil, the electrothermal heater comprising a carbon nanotube (CNT) fabric and a metal coating at least partially infiltrating pores of the CNT fabric.

In various embodiments, the ice protection system may be disposed on the leading edge. The CNT fabric may undergo a metallization process comprising at least one of electroplating, electroless plating, physical vapor deposition, chemical vapor deposition, and chemical deposition. The electrothermal heater may comprise an electric sheet resistivity between 0.01 and 0.5 ohms/square. The airfoil may be coupled to a main rotor. The metal coating may comprise at least one of copper, silver, nickel, aluminum, tin, and gold.

A blade assembly 900 is disclosed herein. The blade assembly 900 may comprise: an airfoil 902 including a leading edge 116, a trailing edge 118, a pressure side 904, and a suction side 906, the pressure side extending from the leading edge 116 to the trailing edge 118, the suction side 906 extending from the leading edge 116 to the trailing edge 118; and an ice protection system 100 disposed on at least one of the leading edge 116, the pressure side 904, and the suction side 906, the ice protection system 100 comprising an electrothermal heater A, B, C coupled to the airfoil 902, the electrothermal heater comprising a carbon nanotube (CNT) yarn and a metallic coating disposed around an outer surface of the CNT yarn.

In various embodiments, the metal coating may comprise at least one of copper, silver, nickel, aluminum, tin, and gold. The CNT yarn may undergo a metallization process comprising at least one of electroplating, electroless plating, physical vapor deposition, chemical vapor deposition, and chemical deposition. The electrothermal heater may comprise an electric sheet resistivity between 0.01 and 0.5 ohms/square. The ice protection system may be disposed on the leading edge. The airfoil may be coupled to a main rotor. The blade assembly may further comprise a plurality of the CNT yarn, wherein the plurality of the CNT yarn forms a woven pattern.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 1B illustrates a perspective view of a rotary aircraft, in accordance with various embodiments;

FIG. 2A illustrates an ice protection system for a blade of an aircraft, in accordance with various embodiments;

FIG. 2B illustrates various cross-sections of the blade from FIG. 2A, in accordance with various embodiments;

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact.

In various embodiments, a heating element for use in ice protection systems are disclosed herein. The heating element may comprise a carbon nanotube (CNT) element and a metallic element. In various embodiments, the CNT element may be metallized to form the heating element. In various embodiments, the CNT element may be woven through a wire mesh to form the heating element. In various embodiments, the heating element may be lighter than typical metallic heating elements and contain higher conductivity relative to typical CNT heating elements.

Figure 1A:
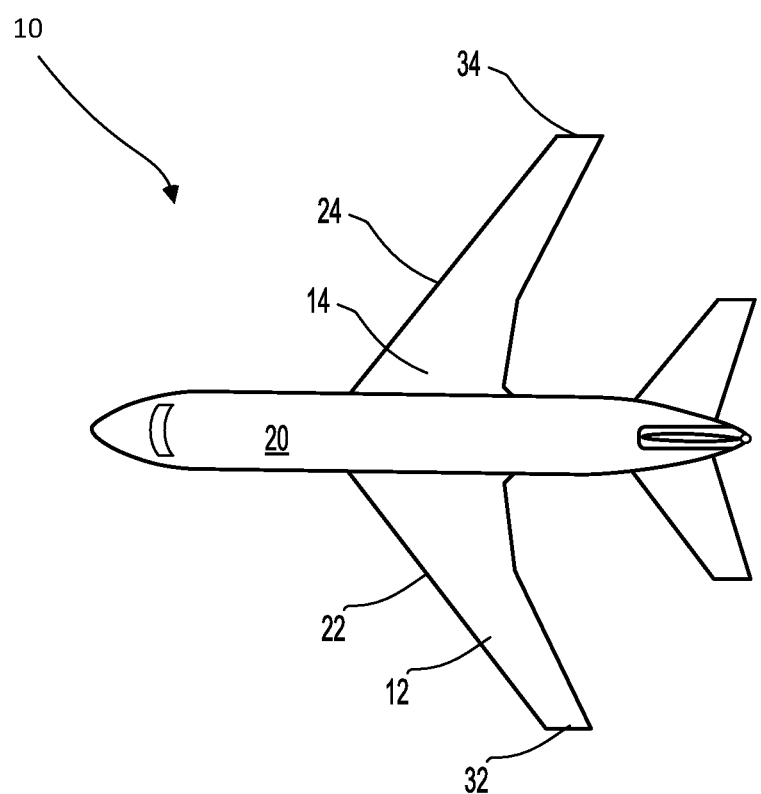
FIG. 1A illustrates a plain view showing an aircraft, in accordance with various embodiments.

With reference to FIG. 1A, an aircraft 10 is provided with a left side wing 12 and a right side wing 14 designed to provide lift to the aircraft and enable it to fly. The aircraft 10 may also be provided with any of a left side horizontal stabilizer, right side horizontal stabilizer, vertical stabilizer(s), and/or canards. Each wing 12, 14 may have a leading edge 22, 24 extending from the fuselage 20 to a wing tip 32, 34. The leading edge 22, 24 may direct the flow of air around each wing 12, 14 during operation. The flow traveling under the wing may provide pressure in the vertical direction of the wing and generate lift for the aircraft. During operation, leading edges 22, 24 may experience ice accretion at high altitudes due to cold temperatures. Aircraft leading edges 22, 24 may be structurally supported by various ribs spaced across the span of the leading edge 22, 24. In various embodiments, leading edges 22, 24 may be heated by a thermoelectric element extending along the span of the leading edge 22, 24. In various embodiments, wiring may extend along the span and provide electrical connections to a thermoelectric element and/or electrical components needing power along the wing 12, 14, such as wing tip lights. The wiring may be supported by the plurality of structural ribs providing support to the leading edges 22, 24. During operation of the aircraft 20, the wings 12, 14 may be exposed to cold temperatures (e.g., below 0° C.) and/or benefit from an ice protection system. In various embodiments, wings 12, 14 as disclosed herein are synonymous with blades.

Referring now to FIG. 1B, an aircraft 50, in accordance with various embodiments, is illustrated. The aircraft 50 includes an airframe 60 mechanically coupled to a main rotor 70. Main rotor 70 may include a plurality of rotary blades. The plurality of rotor blades may include a rotary blade 72. During operation of the aircraft 50, the main rotor 70 may be exposed to cold temperatures (e.g., below 0° C.) and/or benefit from an ice protection system.

Figure 1C:
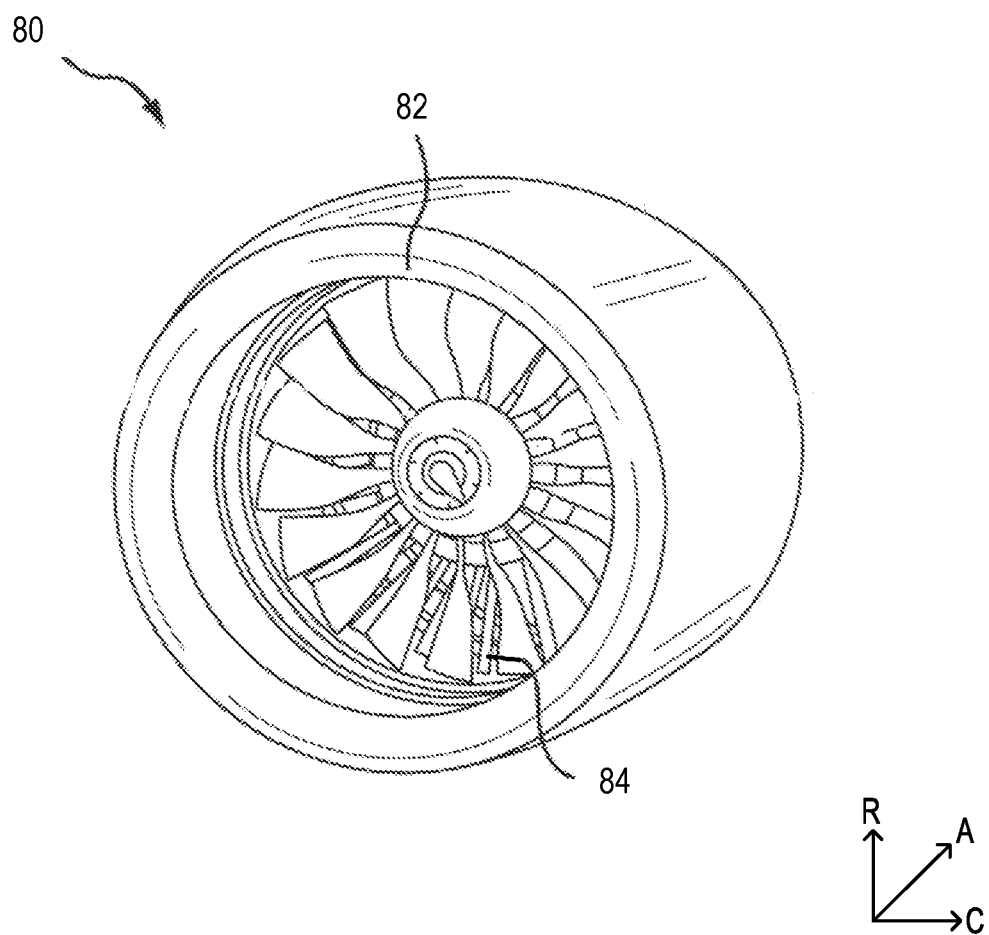
FIG. 1C illustrates a perspective view of an engine for an aircraft, in accordance with various embodiments.

Referring now to FIG. 1C, a fixed-wing aircraft 10 or rotary-wing aircraft 50 can have one or more engines 80. The engine(s) may have an air inlet with a plurality of blades 82, each blade having a leading edge. If the engine is a gas turbine engine, it may have a plurality of inlet guide vanes 84 with leading edges. During operation of the aircraft 10 or aircraft 80, the engine inlets may be exposed to cold temperatures (e.g., below 0° C.) and/or benefit from an ice protection system.

Figure 1D:
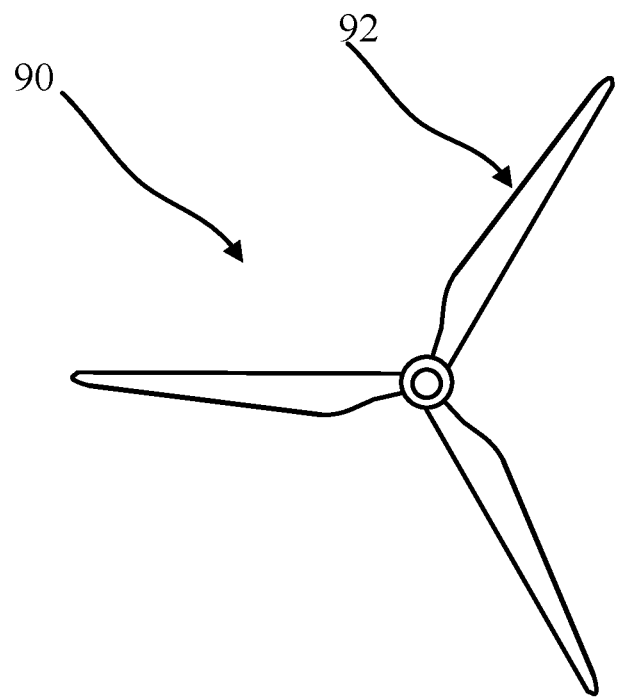
FIG. 1D illustrates a front view of a propeller for an aircraft, in accordance with various embodiments.

Referring now to FIG. 1D, a fixed-wing aircraft 10 or rotary wing aircraft 50 can have one or more propellers 90 with leading edges 92. During operation of the aircraft 10 or aircraft 50, the propellers 90 may be exposed to cold temperatures (e.g., below 0° C.) and/or benefit from an ice protection system. In various embodiments, propellers 90 include blades, as disclosed herein.

Referring now to FIG. 2A, an ice protection system 100 for a blade of an aircraft (e.g., aircraft 10 from FIG. 1A and/or aircraft 50 from FIG. 1B) is illustrated, in accordance with various embodiments. The ice protection system 100 may include a blade 110 extending from an inboard end 112 to an outboard end 114 (e.g., a tip, or the like). The blade 110 includes a leading edge 116 and a trailing edge 118. The blade 110, which may be a portion of blade assembly 900, may comprise an airfoil 902 including a leading edge 116, a trailing edge 118, a pressure side 904, and a suction side 906, the pressure side extending from the leading edge 116 to the trailing edge 118, the suction side 906 extending from the leading edge 116 to the trailing edge 118. The blade assembly 900 may also comprise an ice protection system 100 disposed on at least one of the leading edge 116, the pressure side 904, and the suction side 906, the ice protection system 100 comprising an electrothermal heater A, B, C coupled to the airfoil 902, the electrothermal heater comprising a carbon nanotube (CNT) yarn and a metallic coating disposed around an outer surface of the CNT yarn. The ice protection system may further comprise a first heating element 121 (e.g., heater A) and a second heating element 131 (e.g., heater B). The first heating element 121 may be disposed proximate leading edge 116 internal to blade 110 proximate the inboard end 112. The second heating element 131 may be disposed internal to blade 110 and adjacent to the first heating element 121 distal to inboard end 112.

In various embodiments, ice protection system 100 may further comprise a third heating element 141 (e.g., heater C). The third heating element 141 may be disposed proximate outboard end 114 and/or distal to inboard end 112. In various embodiments, the second heating element 131 may be disposed between first heating element 121 and third heating element 141. The first heating element 121, the second heating element 131, and the third heating element 141 may be configured for spanwise shedding of ice disposed on leading edge 116 of blade 110. First heating element 121, second heating element 131, and third heating element 141 may be configured to heat leading edge 116 independent of each other. In various embodiments, first heating element 121 and second heating element 131 may be active while third heating element 141 is inactive. In various embodiments, any number of heating elements may be active or inactive at a given time based on energy available to the ice protection system 100 or the like.

Although described herein as including distinct heating elements disposed spanwise along the leading edge 116 of blade 110, the disclosure is not limited in this regard. For example, an ice protection system 100 may include a single heating element or sequential heating elements, the heating element(s) may travel along the span of the airfoil, along the chord or wrap of the airfoil, in zig-zag pattern, in a serpentine pattern, or any other desirable pattern.

In various embodiments, each heating element (e.g., first heating element 121, second heating element 131, and/or third heating element 141) may be any electrothermal heater as described further herein.

Referring now to FIG. 2B, cross sections of leading edge 116 at each heater assembly location from FIG. 2A is illustrated, in accordance with various embodiments. Referring to Section A-A of a first portion 120 of blade 110 may comprise first heating element 121, a first laminate layer 122, a second laminate layer 123, a third laminate layer 124, a second heater feed conductive element 126, and a second heater return conductive element 127. The first heating element 121 may be disposed between the first laminate layer 122 and the second laminate layer 123. The second heater feed conductive element 126 and the second heater return conductive element 127 may be disposed between the second laminate layer 123 and the third laminate layer 124. As illustrated, the first heating element 121 is separated from the exterior surface 119 by one laminate layer 122. However, those skilled in the art will recognize that the first heating element 121 may be separated from the exterior surface 119 by any suitable number of laminate layers 122. Similarly, second heater feed conductive element 126 and second heater return conductive element 127 may be disposed between any suitable number of laminate layers. In various embodiments, with combined reference to FIGS. 2A and 2B, second heater feed conductive element 126 and second heater return conductive element 127 may extend from inboard end 112 to a connection point of second heating element 131.

In various embodiments, first portion 120 of blade 110 may further comprise a fourth laminate layer 125, a third heater feed conductive element 128, and a third heater return conductive element 129. The third heater feed conductive element 128 and the third heater return conductive element 129 may be disposed between the third laminate layer 124 and the fourth laminate layer 125.

Referring to Section B-B of a second portion 130 of blade 110 may comprise second heating element 131, first laminate layer 122 and second laminate layer 123. The second heating element 131 may be disposed between the first laminate layer 122 and the second laminate layer 123.

In various embodiments, the second heater feed conductive element 126 and the second heater return conductive element 127 may be discrete elements from the second heating element 131. In various embodiments, the second heating element 131 may be coupled to the second heater feed conductive element 126 and the second heater return conductive element 127 by any method known in the art, such as soldering or the like.

In various embodiments, second portion 130 of blade 110 may further comprise third laminate layer 124, third heater feed conductive element 128, and third heater return conductive element 129. The third heater feed conductive element 128 and the third heater return conductive element 129 may be disposed between the second laminate layer 123 and the third laminate layer 124. In various embodiments, with combined reference to FIGS. 2A and 2B, third heater feed conductive element 128 and third heater return conductive element 129 may extend from inboard end 112 to a connection point of third heating element 141.

Referring to Section C-C of a third portion 140 of blade 110 may comprise third heating element 141, first laminate layer 122 and second laminate layer 123. The third heating element 141 may be disposed between the first laminate layer 122 and the second laminate layer 123.

In various embodiments, heating elements 121, 131, 141 may be manufactured of a metallized carbon nanotube (CNT) element as described further herein. The metallized CNT element may comprise metallized CNT yarn, metallized CNT fabric, or a combination of the two.

In various embodiments, each heater feed conductive element 126, 128 and each heater return conductive element 127, 129 may be in electrical communication with a power source 150. The power source 150 may be configured to provide power to the heaters 121, 131, 141.

Figure 3:
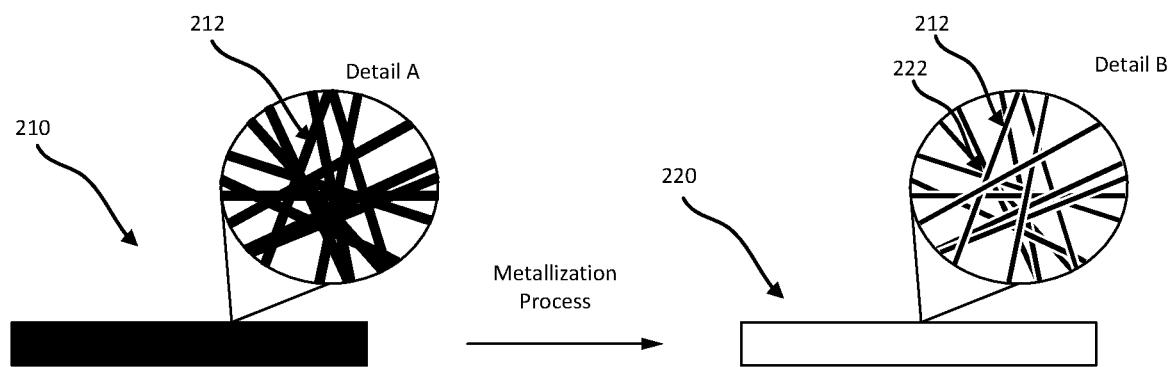
FIG. 3 illustrates a heating element for use in an ice protection system, in accordance with various embodiments.

Referring now to FIG. 3, a process of manufacturing a heating element 220 for use in an ice protection system (e.g., ice protection system 100 from FIGS. 2A and 2B), is illustrated in accordance with various embodiments. In various embodiments, heating elements 121, 131, 141 from FIGS. 2A and 2B may be in accordance with heating element 220. In various embodiments, the heating element 220 comprises a carbon nanotube (CNT) fabric 210. In various embodiments, the CNT fabric 210 may be non-woven CNT fabric. In various embodiments, the CNT fabric 210 comprises a plurality of carbon nanotubes 212. In various embodiments, the CNT fabric 210 may be manufactured by synthesizing the plurality of carbon nanotubes 212 for an extended period of time within a reactor to form long carbon nanotubes that are entangled in an aerogel web, synthesizing the plurality of carbon nanotubes 212 on a substrate for alignment, or the like.

In various embodiments, the CNT fabric 210 may undergo a metallization process to form the heating element 220. For example, a "metallization process" as described herein, may include electroplating, electroless plating, physical vapor deposition, chemical vapor deposition, and chemical deposition. In various embodiments, each carbon nanotube in the plurality of carbon nanotubes 212 of the heating element 220 include a metal coating 222 disposed on an outer surface of the respective carbon nanotube. In various embodiments, the metal coating 222 may infiltrate pores of the CNT fabric 210 to form the heating element 220. The metal coating 222 may comprise copper, silver, nickel, aluminum, tin, gold, or a combination thereof.

In various embodiments, the heating element 220 may comprise higher conductivity relative to typical heating elements in ice protection systems. For example, the heating element 220 may comprise an electric sheet resistivity between 0.01 and 0.5 ohms/square. In this regard, a large conductivity range may result in greater availability for a wide variety of ice protection applications, such as rotary blade applications, fixed wing applications, or the like.

Figure 4:
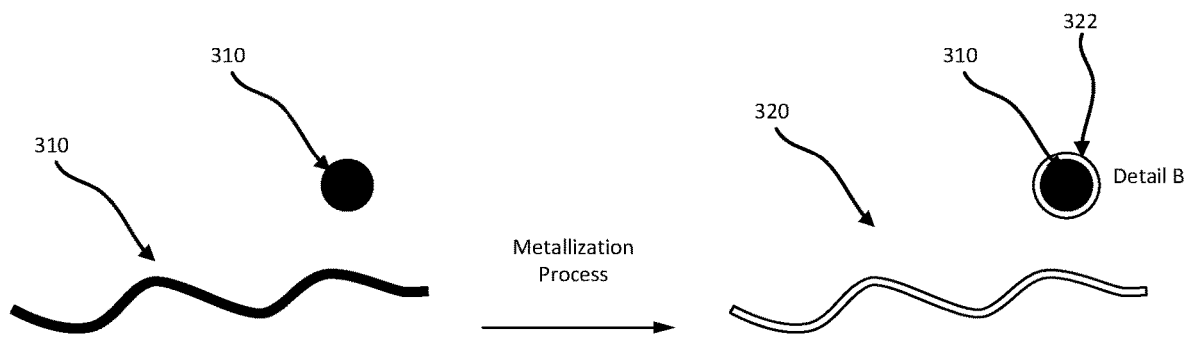
FIG. 4 illustrates a metallized carbon nanotube (CNT) yarn for use in a heating element of an ice protection system, in accordance with various embodiments.

Referring now to FIG. 4, a process of manufacturing a metallized CNT yarn 320 for use in a heating element of an ice protection system (e.g., ice protection system 100 from FIGS. 2A and 2B), is illustrated in accordance with various embodiments. In various embodiments, the metallized CNT yarn 320 comprises a carbon nanotube (CNT) yarn 310. In various embodiments, the CNT yarn 310 may undergo a metallization process to form the metallized CNT yarn 320. The metallization process may be in accordance with the metallization process for heating element 220 from FIG. 3.

Figure 5:
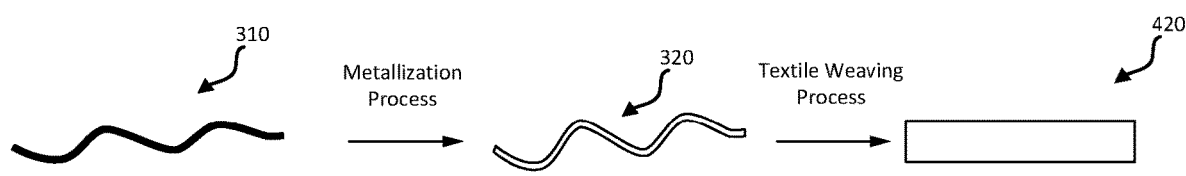
FIG. 5 illustrates a heating element for use in an ice protection system, in accordance with various embodiments.
Figure 6:
FIG. 6 illustrates a heating element for use in an ice protection system, in accordance with various embodiments.

The metallized CNT yarn 320 may comprise the CNT yarn 310 and a metal coating 322 disposed on around an outer surface of the CNT yarn 310 (as shown in detail B). The metal coating 222 may comprise copper, silver, nickel, aluminum, tin, gold, or a combination thereof In various embodiments, the metallization process may be performed prior to weaving the CNT yarn 310 or after weaving the CNT yarn 310 into a heating element. For example, with reference now to FIGS. 5 and 6, a process of manufacturing a heating element 420 for use in an ice protection system (e.g., ice protection system 100 from FIGS. 2A and 2B), is illustrated in accordance with various embodiments. In various embodiments, heating elements 121, 131, 141 from FIGS. 2A and 2B may be in accordance with heating element 420. In various embodiments, the heating element 420 comprises a plurality of metallized CNT yarn 320 from FIG. 3. In various embodiments, the CNT yarn 310 may be woven prior to metallization (e.g., FIG. 6) or after metallization (e.g., FIG. 5). In various embodiments, the heating element 420 comprises the plurality of metallized CNT yarn 320 from FIG. 4 in a woven pattern, or the like.

In various embodiments, the heating element 420 may comprise higher conductivity relative to typical heating elements in ice protection systems. For example, the heating element 420 may comprise an electric sheet resistivity between 0.01 and 0.5 ohms/square. In this regard, a large conductivity range may result in greater availability for a wide variety of ice protection applications, such as rotary blade applications, fixed wing applications, or the like.

Figure 7:
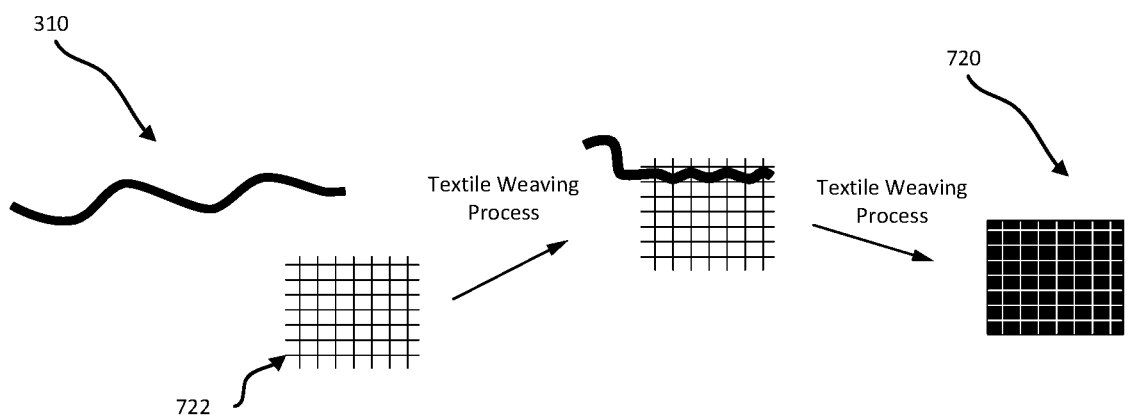
FIG. 7 illustrates a heating element for use in an ice protection system, in accordance with various embodiments.

Referring now to FIG. 7, a process of manufacturing a heating element 720 for use in an ice protection system (e.g., ice protection system 100 from FIGS. 2A and 2B), is illustrated in accordance with various embodiments. In various embodiments, heating elements 121, 131, 141 from FIGS. 2A and 2B may be in accordance with heating element 720. In various embodiments, the heating element 720 comprises a CNT yarn 310 and a metal mesh 722. The metal mesh 722 may comprise copper, silver, nickel, aluminum, tin, gold, or a combination thereof. In various embodiments, the CNT yarn 310 may be woven through the metal mesh 722 via a textile weaving process and the process may be repeated until the heating element 720 is formed. In this regard, the heating element 720 may comprise a plurality of the CNT yarn 310 woven through a metal mesh 722 via a textile weaving process or the like.

In various embodiments, the heating element 720 may comprise higher conductivity relative to typical heating elements in ice protection systems. For example, the heating element 720 may comprise an electric sheet resistivity between 0.01 and 0.5 ohms/square, or between 0.1 and 0.5 ohms/square. In this regard, a large conductivity range may result in greater availability for a wide variety of ice protection applications, such as rotary blade applications, fixed wing applications, or the like.

Figure 8:
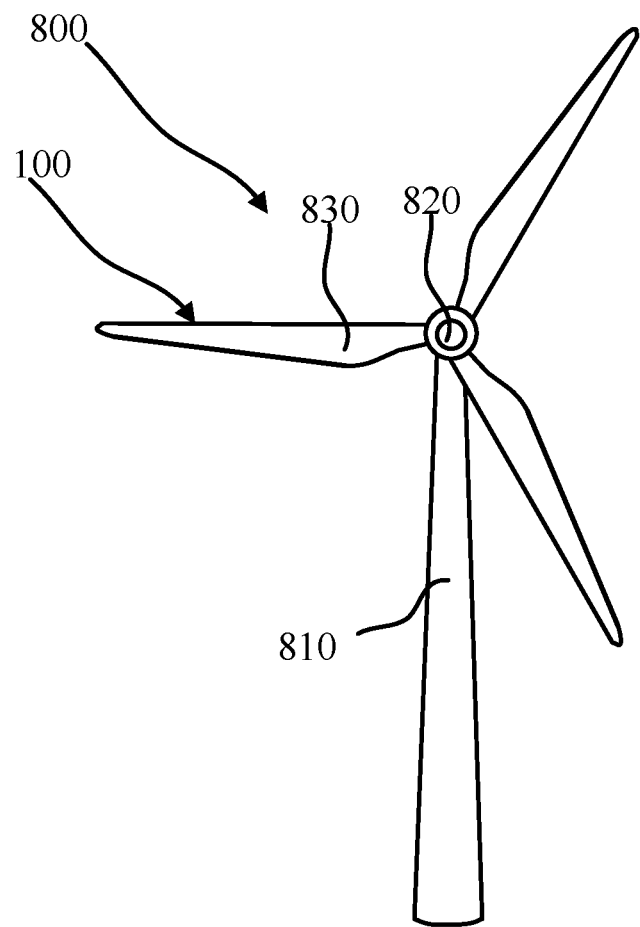
FIG. 8 illustrates a wind turbine including an ice protection system, in accordance with various embodiments.

Referring now to FIG. 8, a wind turbine 800, in accordance with various embodiments, is illustrated. Wind turbine 800 comprises a tower 810, a rotor 820, and a blade 830. In various embodiments, wind turbine 800 includes a plurality of blade 830. In various embodiments, wind turbine 800 may include ice protection system 100. In various embodiments, wind turbine 800 may include an electrothermal heater that includes a heating element as disclosed herein (e.g., heating element 220, heating element 420, and/or heating element 720).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ice protection system, comprising:
a blade comprising an airfoil that includes a leading edge, a trailing edge, a pressure side, and a suction side, the pressure side extending from the leading edge to the trailing edge, the suction side extending from the leading edge to the trailing edge, the blade having a first laminate layer, a second laminate layer, and a third laminate layer;
an electrothermal heater disposed on at least one of the leading edge, the pressure side, and the suction side, and disposed between the first laminate layer and the second laminate layer, the electrothermal heater configured to receive a current from a power source, the electrothermal heater comprising a first plurality of metallized carbon nanotube (CNT) elements disposed in a first direction and a second plurality of metallized carbon nanotube (CNT) elements in a second direction, wherein:
the first plurality of metallized CNT elements and the second plurality of metallized CNT elements comprise a plurality of metallized CNT yarn,
each of the plurality of metallized CNT yarn comprises a CNT yarn and a metal coating disposed around an outer surface of the CNT yarn, and
the plurality of metallized CNT yarn form a woven pattern;
a heater feed conductive element disposed between the second laminate layer and the third laminate layer; and
a heater return conductive element disposed between the second laminate layer and the third laminate layer.

2. The ice protection system of claim 1, wherein the blade is a rotary blade for an aircraft, and wherein the electrothermal heater comprising an electric sheet resistivity between 0.01 and 0.5 ohms/square.

3. The ice protection system of claim 1, wherein the first plurality of metallized CNT elements and the second plurality of metallized CNT elements form a metallized CNT fabric.

4. The ice protection system of claim 1, wherein the airfoil is coupled to a main rotor.

5. The ice protection system of claim 1, wherein the metal coating comprises at least one of copper, silver, nickel, aluminum, tin, and gold.

6. The ice protection system of claim 1, wherein the heater feed conductive element extends from the power source to the electrothermal heater, and wherein the heater return conductive element extends from the electrothermal heater to the power source.

7. The ice protection system of claim 6, further comprising the power source, wherein the power source is configured to provide power to the electrothermal heater.

8. The ice protection system of claim 1, further comprising a second electrothermal heater disposed outboard of the electrothermal heater along at least one of the leading edge, the pressure side, and the suction side, and disposed between the first laminate layer and the second laminate layer, the second electrothermal heater configured to be controlled independently of the electrothermal heater.

* * * * *